US008035946B2

(12) United States Patent
Eriksson

(10) Patent No.: US 8,035,946 B2
(45) Date of Patent: Oct. 11, 2011

(54) OVERVOLTAGE PROTECTOR CIRCUIT AND A DETECTOR CIRCUIT FOR SUPERVISING SUCH A PROTECTOR CIRCUIT

(75) Inventor: Tomas Eriksson, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 428 days.

(21) Appl. No.: 12/279,761

(22) PCT Filed: Feb. 16, 2006

(86) PCT No.: PCT/EP2006/060019
§ 371 (c)(1),
(2), (4) Date: Aug. 18, 2008

(87) PCT Pub. No.: WO2007/093217
PCT Pub. Date: Aug. 23, 2007

(65) Prior Publication Data
US 2009/0085758 A1    Apr. 2, 2009

(51) Int. Cl.
*H02H 1/04*  (2006.01)
*H02H 9/06*  (2006.01)
*G08B 21/00* (2006.01)

(52) U.S. Cl. ............... 361/119; 361/120; 340/662

(58) Field of Classification Search .......... 340/638–639, 340/659–662; 361/119, 120, 111
See application file for complete search history.

(56) References Cited

U.S. PATENT DOCUMENTS

| | | | | |
|---|---|---|---|---|
| 4,847,719 A * | 7/1989 | Cook et al. | ...... | 361/13 |
| 5,153,806 A * | 10/1992 | Corey | ...... | 361/56 |
| 5,790,363 A * | 8/1998 | Chaudhry | ...... | 361/119 |
| 5,805,070 A * | 9/1998 | Eriksson | ...... | 340/662 |
| 5,966,283 A | 10/1999 | Glaser et al. | | |
| 6,188,557 B1 * | 2/2001 | Chaudhry | ...... | 361/111 |
| 6,212,048 B1 * | 4/2001 | Chaudhry | ...... | 361/42 |
| 2006/0164780 A1 * | 7/2006 | Lark | ...... | 361/118 |

* cited by examiner

Primary Examiner — George Bugg
Assistant Examiner — Anne Lai

(57) ABSTRACT

An overvoltage protector circuit for telecommunication equipments is disclosed. The protector circuit includes a gas discharge tube connected to a communication line for passing any harmful surge currents appearing in the line to ground. A degradation detector circuit is arranged to detect any degradation of the gas discharge tube, the detector circuit comprises a reference gas discharge tube with a higher breakdown voltage than the supervised gas discharge tube and an alarm circuit loop connected to an alarm system. The alarm system is arranged to detect when current is breaking through the reference gas discharge tube and to initiate a degradation alarm.

10 Claims, 3 Drawing Sheets

OVERVOLTAGE PROTECTOR CIRCUIT AND A DETECTOR CIRCUIT FOR SUPERVISING SUCH A PROTECTOR CIRCUIT

TECHNICAL FIELD

This invention relates to an overvoltage protector circuit for telecommunication equipments, said protector including a gas discharge tube connected to a communication line interface for passing any harmful surge currents appearing in the line to the ground. The invention also relates to a detector circuit for supervising degradation of such an overvoltage protector circuit.

BACKGROUND

Telecommunication equipment connected to exposed metallic communication lines is in most cases protected against destructive overvoltages caused by e.g. lightning. The overvoltage protectors must have a high surge current capability, and they are not allowed to have any electrical properties that can disturb the communication signals on the lines. The only overvoltage protection component that fulfils both requirements is the gas discharge tube, which is used in many overvoltage protection circuits for telecommunication equipment. In particular gas discharge tubes are used as overvoltage protectors on high speed communication lines because they do not affect or change transmission characteristics of the lines. The reason is the very low capacitance and very high isolation resistance of a gas discharge tube when compared to semiconductor type protectors.

One known problem with gas discharge tubes is, however that they when exposed to repeated overvoltage transients, degrade and finally stops working. The degradation appear as a gradually increasing break down voltage, which finally becomes so high that the gas discharge tube stops functioning as an overvoltage protector, and starts behaving like an open circuit with a very high resistance, about 1000 Mohm, connected between the signal line and ground. The telecommunication equipment is now unprotected against overvoltages, and since an open circuit does not disturb the communication line, there is no indication that anything is wrong with the overvoltage protection until the telecommunication equipment is destroyed by overvoltages.

This degradation is impossible to measure while the overvoltage protector is connected to the communication line, since the high test voltage would cause communication errors on the line, and if the gas discharge tube is broken and does not spark over, the high test voltage could even cause damages in the communications equipment connected to the line.

One way of limiting the problem mentioned above is to perform regular maintenance and physically remove all gas discharge tube from the communication lines and test them with a special high voltage gas discharge tube tester at least once a year.

Another way is to measure the breakdown voltage of the gas discharge tube during the voltage transients that are caused by lightning, and let the detector set an alarm if breakdown voltage exceeds a set level. In this case, the measurement does not cause any additional disturbances in the communication, since the communication is disturbed by the naturally occurring transients anyway. However, since a gas discharge tube has a breakdown voltage that is dependent on the dv/dt of the overvoltage transient (how fast the voltage rises), the detector must adjust the breakdown voltage alarm level upwards for a fast dv/dt and downwards for a slow dv/dt.

A more practical solution is disclosed in U.S. Pat. No. 5,966,283, in which a detector is connected to the overvoltage protector circuit in order to detect when the overvoltage protector has degraded so much that it will fail to work as intended. The detector includes a high voltage gas discharge tube and a fuse connected in parallel with the protector gas discharge tube and to ground. The idea is that the detector gas discharge tube is selected to have such a high breakdown voltage that it only sparks over when the protector gas discharge tube has been degraded to a certain level.

When that occurs, an alarm circuit is activated to announce that the protector gas discharge tube needs to be exchanged. The circuit is arranged so that one pole of the alarm output port is connected through the high voltage gas discharge tube to the communication line on which overvoltage transients occurs. When the high voltage gas discharge tube sparks over for the first time, the fuse will be blown, and an overvoltage transient will be passed to the alarm output port. So far the solution works well but after the fuse has blown, the alarm output port is still connected to the communication line. Since overvoltages often come in series new ones can pass from the line and out through the alarm output port to the external alarm central and cause damage.

SUMMARY

The main object of the present invention is to provide an overvoltage protector circuit and a detector for such a protector that overcome the problems mentioned in connection with known devices of that kind. Another object is to achieve an overvoltage protector circuit and a detector for such a protector that works independently of power supply and may fit into existing telecommunication systems.

Briefly these objects of the present invention are accomplished by an overvoltage protector circuit for telecommunication equipments, said protector circuit including a gas discharge tube connected to a communication line for passing any harmful surge currents appearing in the line to ground. A degradation detector circuit is arranged to detect any degradation of the gas discharge tube, the detector circuit comprises a reference gas discharge tube with a higher breakdown voltage than the supervised gas discharge tube and an alarm circuit loop connected to an alarm system. Said alarm system is arranged to detect when current is breaking through the reference gas discharge tube and to initiate a degradation alarm.

Furthermore the detector circuit according to the invention comprises a detector circuit for supervising degradation of an overvoltage protector including a gas discharge tube connected to a communication line for passing any harmful surge currents appearing in the line to ground. A reference gas discharge tube is arranged to be connected to the supervised gas discharge tube and to an alarm circuit loop connected to an alarm system, said reference gas discharge tube having a higher breakdown voltage than the supervised gas discharge tube. The alarm system is arranged to detect when current is breaking through the reference gas discharge tube and to initiate a degradation alarm.

An advantage of the present invention is that telecommunication equipment is not destroyed by thunderstorms and lightning because of worn out overvoltage protectors. Since the alarm can be set before the overvoltage protector has stopped working, it is also possible to coordinate the replacement of degraded overvoltage protectors into the normal maintenance schedule.

Another advantage is that the overvoltage protector circuit does not require any power feed, it can be used with any radio base station or any telecommunication equipment that have an alarm input, regardless of which system voltage that is used, and without the need to find a free power outlet and install a power cable.

Furthermore, the alarm circuit loop is overvoltage protected and electrically equal to a "floating" normally closed switch that opens to indicate an alarm. This provides a very common alarm interface and no conversion or protection circuit is needed between the alarm circuit loop and the telecommunication equipment.

More in detail and in preferred embodiments, the overvoltage protector and degradation detector circuits possess the following features and advantages.

The circuits are designed to give an early warning when a gas discharge tube has started to degrade, and thus provide the network operator time to replace the gas discharge tube before the degradation is severe enough to jeopardize the overvoltage protection of the telecommunication equipment. Without a degradation detector circuit, there is no way to know when an gas discharge tube has degraded or stopped functioning, without manually removing the gas discharge tube from the communication line, and test it with high voltage transients.

The degradation detector circuit is designed to sense the gradual increase in breakdown voltage that occurs in gas discharge tubes being degraded when exposed to numerous overvoltage transients.

The degradation detector circuit uses each incoming overvoltage transient as a test voltage, and compares the breakdown voltage of each supervised gas discharge tube with a reference voltage. However, since the breakdown voltage of a gas discharge tube is depending on the dv/dt of the incoming overvoltage transient, it cannot be compared to a fixed reference voltage. It has to be compared to a variable voltage with the same dv/dt dependency. The easiest way is to connect a reference gas discharge tube with a bit higher breakdown voltage in parallel with the supervised gas discharge tube, and then sense if the reference gas discharge tube sparks over, which means that the supervised gas discharge tube has degraded. In order to sense a sparkover, two links, each containing a fuse and a low voltage protection diode are connected in parallel between the reference gas discharge tube and ground. If the reference gas discharge tube sparks over, one or both fuses will blow.

The alarm output is connected to the fuses in such a way that during normal conditions (when no overvoltage surge occurs), the reference gas discharge tube isolates the fuses from the signal wires, and the protection diodes isolate the fuses from ground. If both fuses are intact, the external equipment sees a closed circuit through both fuses (=closed loop). If one or both fuses have blown, the external equipment sees an open circuit (=open loop). Both poles of the alarm output are overvoltage protected by the protection diodes, so the external equipment will never be exposed to any overvoltages through the alarm output of the degradation detector circuit.

The reference gas discharge tube in the degradation detector circuit is only used as a breakdown voltage reference, so it can be very small and have very low surge current capability, which in turn means that it can be much more inexpensive than the supervised gas discharge tube.

Other objects, advantages and novel features of the invention will become apparent from the following detailed description when considered in conjunction with the accompanying drawings and claims.

BRIEF DESCRIPTION OF THE DRAWINGS

The invention will be described more in detail with reference to the following drawings, in which.

DETAILED DESCRIPTION

Figure 1:
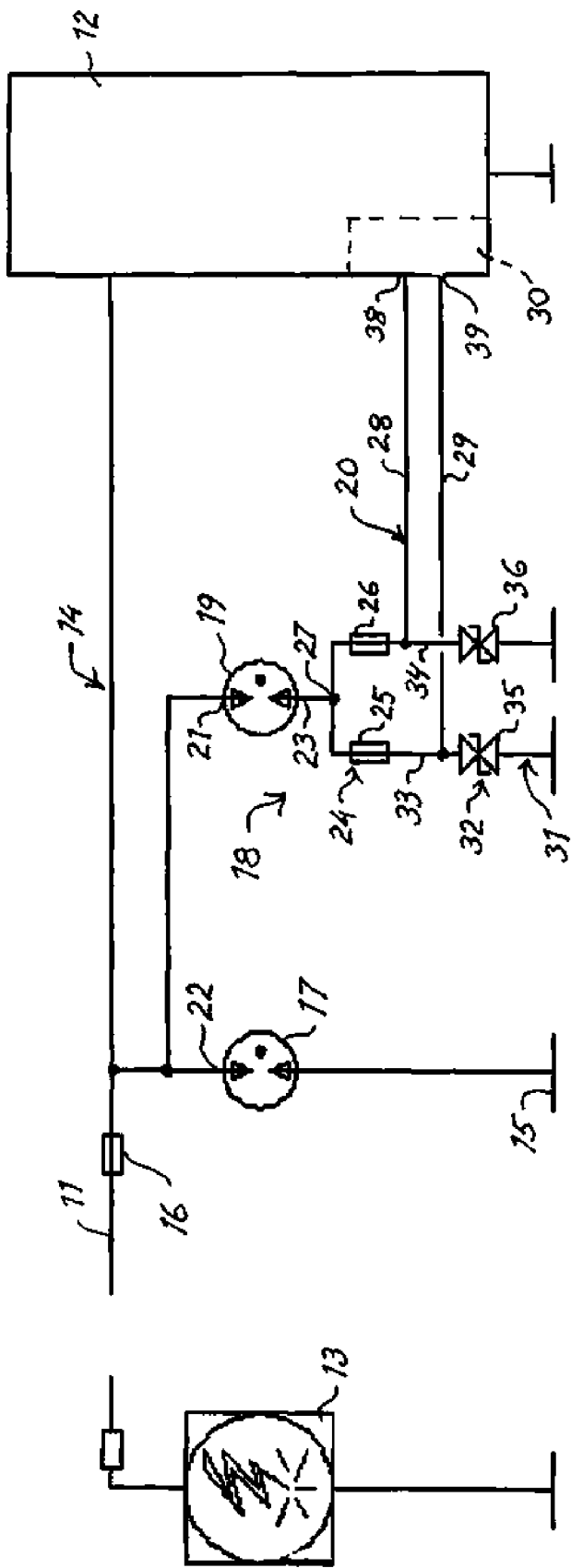
FIG. 1 is a schematic over a voltage protector circuit including a detector circuit according to the invention.

In FIG. 1, there is shown a telecommunication line 11 connected to some telecommunication equipments 12 like a base station in a mobile system. The line 11 is exposed to the risk of sudden voltage increases caused by some overvoltage source 13, generally lightning. An overvoltage protector circuit 14 is connected to the telecommunication line 11 in order to protect the equipments 12 from harmful influence voltage peaks and lead corresponding current peaks to the ground 15. The overvoltage protector circuit 14 comprises as usual a slow acting fuse 16 for protecting the equipments 12 from higher currents appearing under a longer period and a gas discharge tube 17 acting to conduct any peak currents appearing suddenly over a short period to ground 15.

The overvoltage protector circuit further comprises a degradation detector circuit 18 for supervising the function of the gas discharge tube 17, which in a known manner will be gradually degraded by overvoltages generally occurring in the telecommunication line 11. The degradation detector circuit 18 comprises a reference gas discharge tube 19 and an alarm circuit loop 20. Said reference gas discharge tube 19 has a higher break down voltage than the supervised gas discharge tube 17 for reasons that will be described more in detail later.

One first pole 21 of the reference gas discharge tube 19 is connected to the inlet side 22 of the supervised gas discharge tube, whereas the second pole 23 is connected to the alarm circuit loop 20 at a connection point 27. Said loop comprises a fuse means 24 including two fast acting fuses 25, 26, one located on each side of the connection point 27, and connection lines 28, 29 connected to an external alarm system 30 over a two pole alarm output 38, 39 that may be integrated in the telecommunication equipment 12. Disregarding the loop 20, the reference gas discharge tube 19 is connected to ground via a link connection 31 comprising said fuse means 24 and a diode means 32. More in detail, said link connection has two parallel links 33, 34 each of them including one of the fuses 25, 26 and one diode 35, 36 composing said diode means 32. The diodes 35, 36 are of zener configuration that may open for high currents breaking through the reference gas discharge tube, but under a set limit, the reference gas discharge tube 19 and the loop 20 are isolated from ground. The loop 20 including the fuses 25, 26, the connection lines 28, 29 and the alarm system is thus arranged to be "floating", which means that it is electrically isolated from both signal wires and ground.

The overvoltage protector is designed to protect the telecommunication equipments 12 from damages caused by lightning but also to control the function of the gas discharge tube 17 that is arranged to conduct any peak voltages to ground. In its normal function, the supervised gas discharge tube 17 will be slowly degraded and its original low breakdown voltage will gradually increase. As long as its breakdown voltage, however, is lower than the breakdown voltage of the reference gas discharge tube 19, all voltage peaks will be transferred through the supervised gas discharge tube 18 and the degradation detector circuit stays unaffected.

When the degradation and similarly the breakdown voltage has reached a certain level, the breakdown voltage of the supervised gas discharge tube 17 will be at the same or at a higher level than the reference gas discharge tube 19. At this moment the reference gas discharge tube sparks over and the peak current will blow one or both fuses 25, 26 and open the closed alarm circuit loop 20. The change of loop status is easily detectable by the external alarm system 30. The two pole alarm output 38, 39 is in itself protected from harmful influence by the overvoltage and since the supervised gas discharge tube 17 has not ceased to function, it will continue to lead the main peak current to the ground. Possible peak currents that may occur in the link connection 31 before the fuses 25, 26 are both blown will not be transferred to the alarm system, but be conducted to ground via the zener diodes 35, 36. In that way, the diode means 32 has the double function to both protect and isolate the circuit loop 20. The generated alarm could then initiate a service plan for exchange of the supervised gas discharge tube 17. However, since the degradation detector circuit can be set to give an early warning well before the gas discharge tube has stopped working, there can be time for planned and cost effective exchange of the degraded tube.

Depending on the actual circumstances in the telecommunication lines, different characteristics of the components can be chosen. For example, in a GSM base station system, the supervised gas discharge tube can have a breakdown voltage of 70-150 V, the reference gas discharge tube a breakdown voltage of 250-350 V and the zener diodes be selected to open at 10-30 V.

Figure 4:
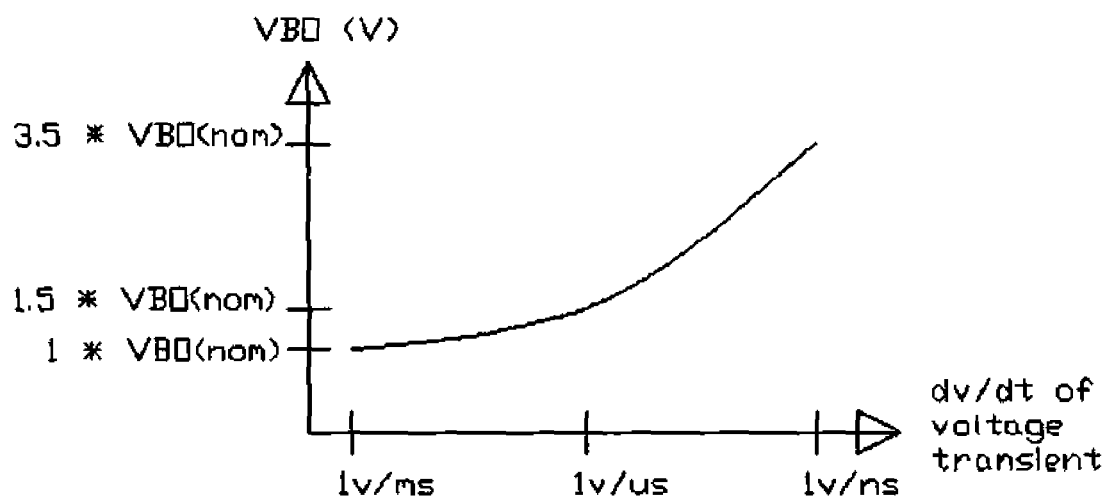

The reference gas discharge tube 19 is only used as a breakdown voltage reference, so it can be chosen to be quite small and have very low surge current capability as compared to the supervised gas discharge tube. It is important, however, that the gas discharge tube characteristics concerning the voltage transient are similar for the two tubes. Referring to FIG. 4, it is shown clearly that the breakdown voltage (VBO) of a gas discharge tube changes very much depending on the actual momentary increase of the voltage transient dv/dt. The breakdown voltage is low for a slowly rising voltage and high for a fast rising voltage. The diagram discloses the common situation that a 1 volt increase by 1 ns increases the breakdown voltage by 3.5 times as compared to a slower increase of 1 volt per ms. The characteristics of the supervised and reference gas discharge tubes should be about the same to ensure that the reference gas discharge tube spots any exceeding breakdown voltage that occurs in the supervised gas discharge tube.

In FIG. 1, there is shown a simple overvoltage protector circuit having only one line 11 to protect and supervise. It is, however, possible to us the same idea and structure to protect and supervise two or more lines as will be described in connection with FIG. 2 and FIG. 3.

Figure 2:
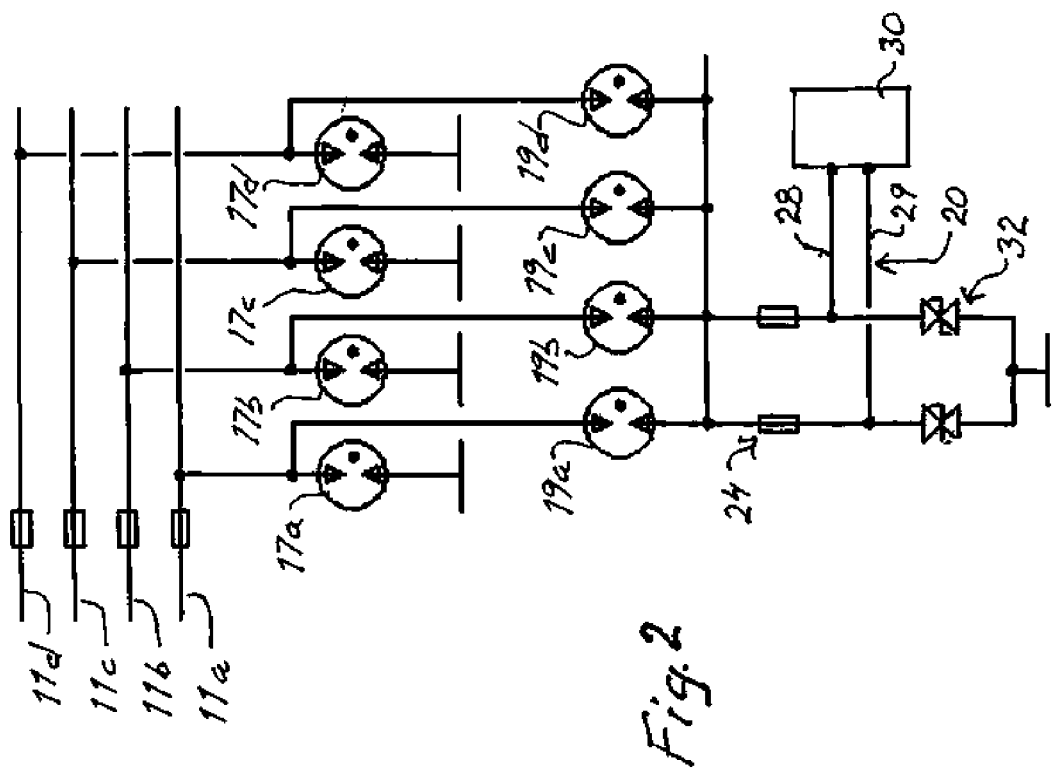
FIG. 2 is a schematic overvoltage protector circuit of an alternative circuit according to the invention.

According to the embodiment shown in FIG. 2, four telecommunication lines 11a, 11b, 11c, 11d are connected to one and the same alarm system 30. Each line has a supervised gas discharge tube 17a, 17b, 17c, 17d and a reference gas discharge tube 19a, 19b, 19c, 19d designated for each supervised gas discharge tube respectively. The fuse means 24 and the diode means 32 are arranged in the same way as shown in FIG. 1. An alarm circuit loop 20 comprises said fuse means 24 and two connections 28, 29 to an external alarm system 30. The arrangement allows any number of gas discharge tubes to be supervised at one place and by the same equipment.

Figure 3:
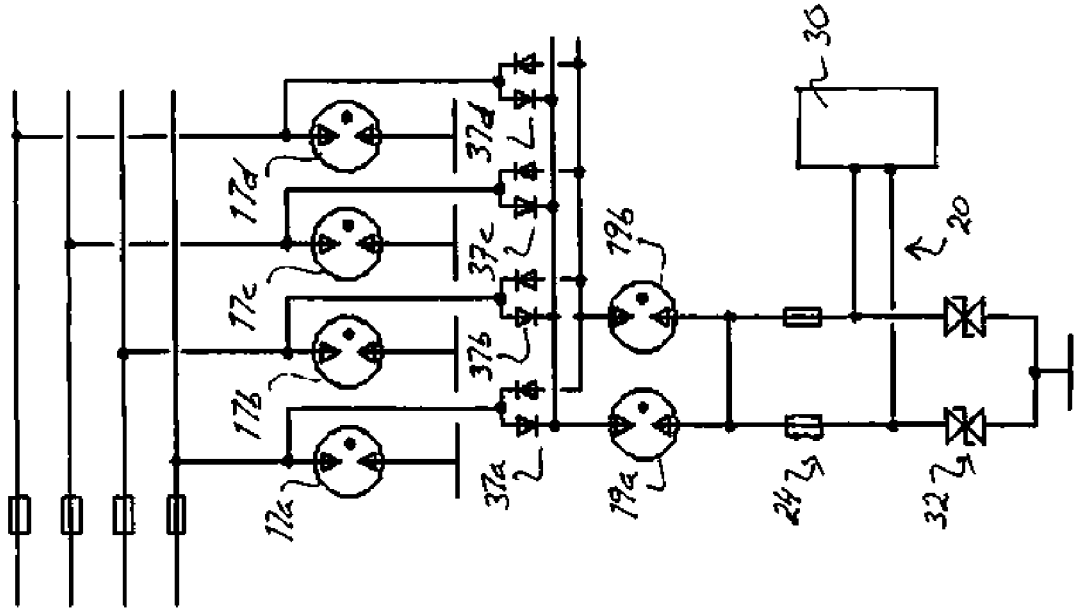
FIG. 3 is a schematic overvoltage protector circuit of a second alternative circuit according to the invention and FIG. 4 is a diagram over the breakdown voltage of a gas discharge tube as a function of the momentary increase (dv/dt) of the voltage transient.

Another embodiment is shown in FIG. 3 in which four telecommunication lines 11a, 11b, 11c, 11d are connected to one degradation detector circuit. The circuit comprises as in the previous embodiment, one fuse means 24, one diode means 32 and one common alarm circuit loop 20. However, instead of having one reference gas discharge tube connected to each supervised gas discharge tube, diode bridges 37a, 37b, 37c, 37d are connected to the input side of each supervised tube 17a, 17b, 17c, 17d. The other side of the diode bridges is connected to two reference gas discharge tubes 19a, 19b and one of them will spark over when a supervised tube has reached its set breakdown voltage. The diode bridges isolate the telecommunication lines, which are connected to the same gas discharge tube from each other and should consist of diodes with low capacitance.

For simplification, the figures of the overvoltage protector circuit and degradation detector circuit contain only 2-pole gas discharge tubes. However, 3-pole gas discharge tubes can be used in both of them to bring down the component count.

The invention claimed is:

1. An overvoltage protector circuit for telecommunication equipments, said protector circuit including a gas discharge tube connected to a communication line for passing any harmful surge currents appearing in the line to the ground, wherein a degradation detector circuit is arranged to detect any degradation of the gas discharge tube, the detector circuit comprises a reference gas discharge tube with a higher breakdown voltage than the supervised gas discharge tube and an alarm circuit loop connected to an alarm system, wherein said alarm system is arranged to detect when current is breaking through the reference gas discharge tube and to initiate a degradation alarm, and wherein the alarm circuit loop is protected from overvoltage when current is breaking through the reference gas discharge tube.

2. The overvoltage protector circuit according to claim 1, wherein the alarm circuit loop is arranged to be closed in its normal state when no current is breaking through the reference gas discharge tube.

3. The overvoltage protector circuit according to claim 1, wherein the alarm circuit loop is arranged to be opened when current is breaking through the reference gas discharge tube.

4. The overvoltage protector circuit according to claim 3, wherein a fuse means is arranged in the alarm circuit loop, which fuse means is arranged to be blown when current is breaking through the reference gas discharge tube and open the closed loop.

5. The overvoltage protector circuit according to claim 1, wherein a link connection is arranged between the reference gas discharge tube and ground, said link connection comprises the fuse means and a diode means, wherein the fuse means is isolated from the communication line by the reference gas discharge tube and from the ground by the diode means.

6. The overvoltage protector circuit according to claim 5, wherein the link connection comprises two links arranged in parallel, each link including a fuse and a diode, the fuses of the links composing said fuse means and the diodes of the links composing said diode means.

7. The overvoltage protector circuit according to claim 1, wherein two or more supervised gas discharge tubes are connected to the same alarm circuit loop, over one or more reference gas discharge tubes.

8. A detector circuit for supervising degradation of an overvoltage protector including a gas discharge tube connected to a communication line for passing any harmful surge currents appearing in the line to ground, comprising a reference gas discharge tube arranged to be connected to the supervised gas discharge tube and to an alarm circuit loop connected to an alarm system, said reference gas discharge tube having a higher breakdown voltage than the supervised gas discharge tube, wherein said alarm system is arranged to detect when current is breaking through the reference gas discharge tube and to initiate a degradation alarm, and wherein the alarm circuit loop is protected from overvoltage when current is breaking through the reference gas discharge tube.

9. The detector circuit according to claim 8, wherein a fuse means is connected between the reference gas discharge tube and the ground which fuse means is arranged to be blown when current is breaking through the reference discharge tube set the alarm circuit loop in a state of alarming a degradation.

10. The detector circuit according to claim 8, wherein the alarm circuit loop is arranged to be closed and isolated from external signals and the ground in its normal state when no current is breaking through the reference gas discharge tube and that the loop is arranged to be opened when current is breaking through the reference discharge tube.

* * * * *